United States Patent Office.

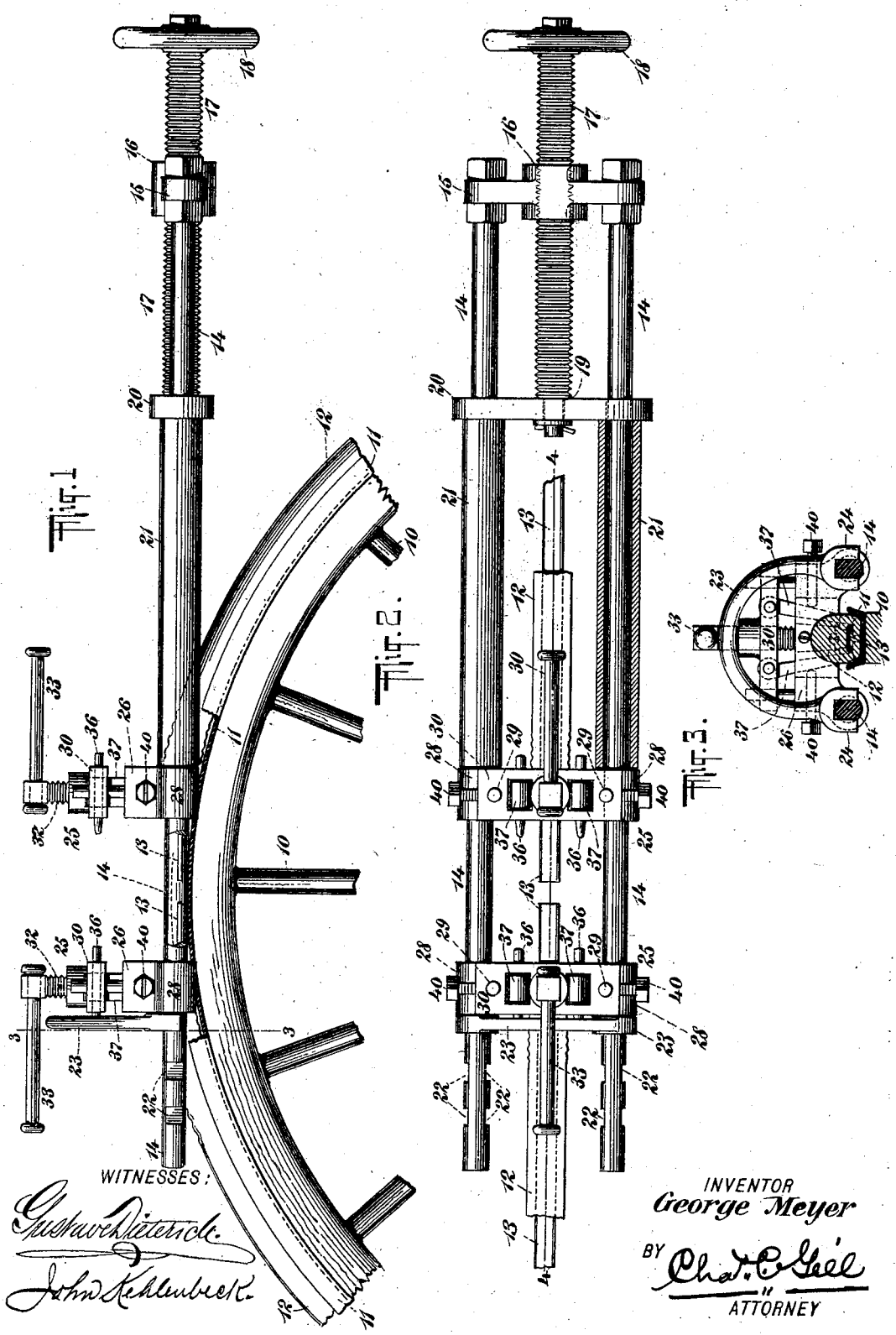

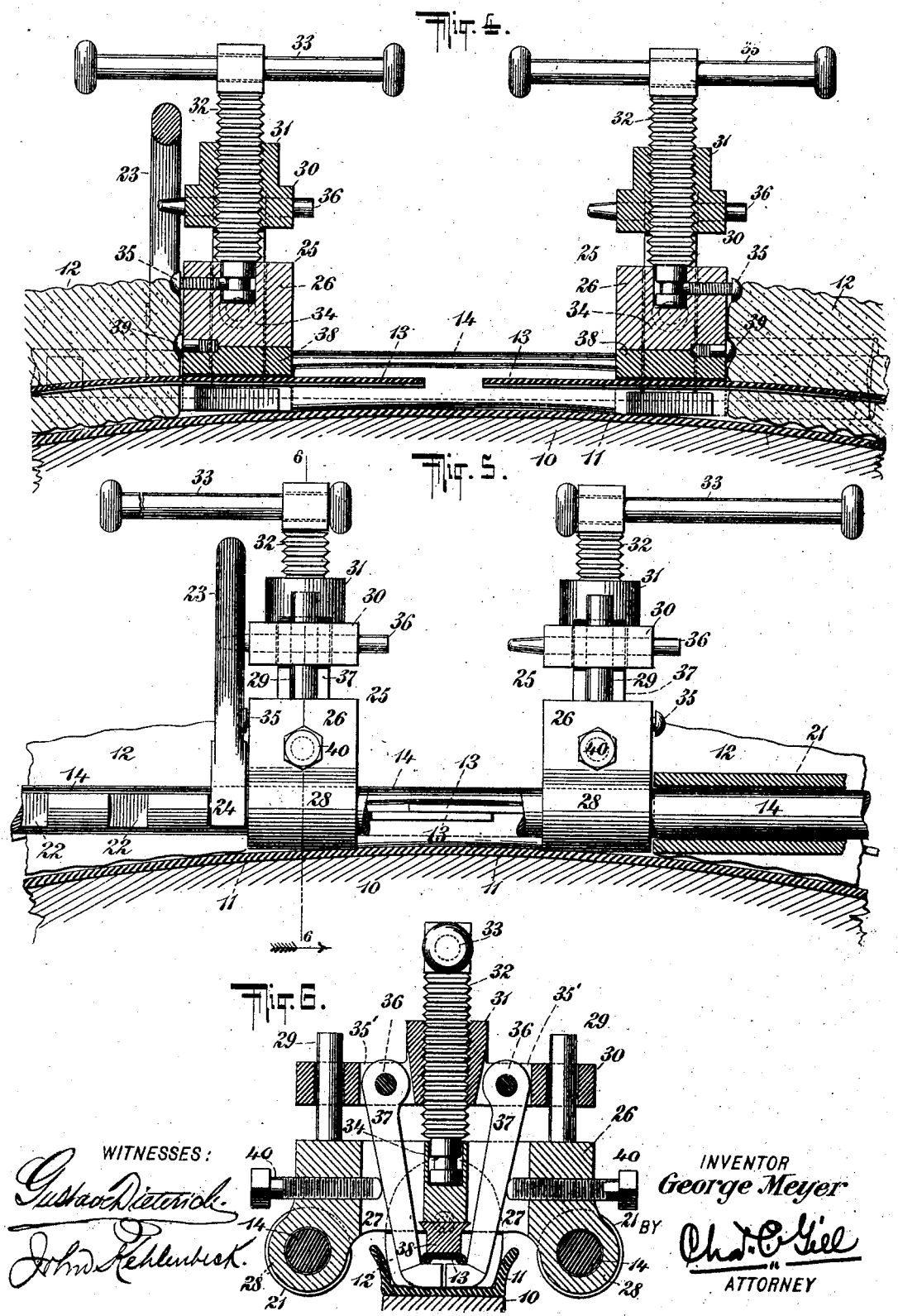

GEORGE MEYER, OF NEW YORK, N. Y.

APPARATUS FOR SECURING RUBBER TIRES TO WHEELS.

SPECIFICATION forming part of Letters Patent No. 693,879, dated February 25, 1902.

Application filed October 15, 1900. Serial No. 33,023. (No model.)

*To all whom it may concern:*

Be it known that I, GEORGE MEYER, a citizen of the United States, and a resident of New York city, in the county of New York and State of New York, have invented certain new and useful Improvements in Apparatus for Securing Rubber Tires to Wheels, of which the following is a specification.

The invention relates to improvements in apparatus for securing rubber tires to wheels; and it consists in the novel features and combinations of parts hereinafter described, and particularly pointed out in the claims.

The object of the invention is to provide adequate and convenient means for securing the two ends of rubber tires containing an interior band to the rim of the wheel and drawing the adjoining ends of said band together, so that they may be readily secured to one another, thereby to bind the rubber tire upon the rim of the wheel.

The nature of the invention and satisfactory means for carrying the same into effect will be fully understood from the detailed description hereinafter presented, reference being had to the accompanying drawings, in which—

Figure 1 is a side elevation, partly broken away and partly in section, of an apparatus constructed in accordance with and embodying my invention and shown in position holding the rubber tire and interior securing-band upon the rim of a wheel. Fig. 2 is a top view, partly in section, of same, the rim of the wheel being omitted from this figure, but a portion of the rubber tire and interior securing-band being illustrated. Fig. 3 is a vertical transverse section of same on the dotted line 3 3 of Fig. 1. Fig. 4 is an enlarged central vertical section of same on the dotted line 4 4 of Fig. 2. Fig. 5 is an enlarged side elevation, partly in section, of a portion of the same and illustrating the relation of the parts after the ends of the interior securing-band have been drawn toward one another until they overlap preparatory to being secured together by riveting, brazing, or otherwise; and Fig. 6 is a vertical transverse section of same on the dotted line 6 6 of Fig. 5.

In the drawings, 10 designates a part of a wheel of known construction; 11, the metal rim on the felly of said wheel; 12, the rubber tire, and 13 the interior securing-band, which traverses the length of said tire and whose ends, by means of the present invention, are to be drawn around the wheel from the position in which they are shown in Fig. 4 to the overlapping position in which they are shown in Fig. 5 preparatory to said ends being riveted or brazed together.

Referring to the apparatus constituting my invention, 14 14 designate two parallel rods connected together at one end by the cross bar or head 15, containing the central internally-threaded hub 16, adapted to receive the operating-screw 17, which at its outer end is provided with the hand-wheel 18 and at its inner end is swiveled in an aperture 19, located at the center of a transverse bar 20, mounted upon the rods 14 14 in parallel relation to the transverse bar 15 and connected with the sleeves 21 21, which are also mounted on said rods 14 14, as clearly illustrated in Fig. 2. The sleeves 21 21 and cross-bar 20 constitute a frame which is movable upon the rods 14 14 by means of the screw 17 and hand-wheel 18. When the screw 17 is turned in one direction, it will move the sleeves 21 21 toward the left, and when the said screw 17 is rotated in the opposite direction it will draw the sleeves 21 21 toward the right. The rods 14 14 are simply plain straight rods, with the exception that at their left-hand ends the said rods are formed with the recesses 22 to receive the key 23, whose purpose will be hereinafter described and which, as shown in Fig. 3, is a bent bar something in the form of a horseshoe, having at its ends the bifurcated arms 24 24 to engage the said recesses 22 in the rods 14, said key 23 straddling the space between the two rods 14 14 and at its ends engaging both of said rods. Upon the rods 14 14 are applied the clamping devices, (numbered as a whole 25 25,) which correspond exactly with one another and are adapted to engage the end portions of the interior metal band 13, as clearly indicated in the drawings. One clamping device 25 is normally set against the ends of the sleeves 21 21, and the other clamping device 25 has for a backing the key 23, as shown in Figs. 1 and 2, and the said clamping devices 25 25 are otherwise free upon the rods 14 14. When the clamping devices 25 25 are in engagement with the ends of the interior band 13 and are in position upon the rods 14 14, they will firmly hold the ends of said band 13 and when actuated by the operating-screw 17 will draw the ends of the said band 13 toward one another from the position in which they are shown in Fig. 4 to that in which they are shown in Fig. 5.

When the operating-screw 17 is turned so as to cause the clamping devices 25 25 to approach one another, the effect of the said screw is to move the transverse parallel bars 15 and 20 in a direction from one another, this causing the sleeves 21 21 to move toward the left and the rods 14 14, carrying the key 23, to move toward the right, and this operation results in the sleeves 21 21 pushing the clamping device 25, with which they are in engagement, toward the left and the key 23 pulling the clamping device 25, with which it is in contact, toward the right, and thus the two clamping devices 25 25 are caused to approach one another and carry the ends of the interior securing-band 13 from their separated position (shown in Fig. 4) to their overlapping position, (shown in Fig. 5,) the degree of the overlapping of the ends of said band 13 being governed at will by the distance the clamping devices 25 25 are caused to approach one another. The strain exerted by the interior band 13 tending to draw the clamping devices 25 25 in a direction from one another is resisted by the key 23 and sleeves 21, which key and sleeves effectually maintain the clamping devices 25 25 in any position which may be given to them by the operation of the screw 17 and hand-wheel 18.

The clamping devices 25 25 are applied upon the ends of the interior band 13 prior to the application of the said band and the tire 12 to the rim of the wheel, and at such time the clamping devices 25 25 are not upon the rods 14 14. I will therefore first describe the details of construction of the clamping devices 25 25 and then explain the method of employing the same. The clamping devices 25 25 correspond exactly with one another and each of said clamping devices comprises a body portion 26, Fig. 6, having an interior transverse slot or opening 27, and formed with the sleeves 28 28 adapted to slide upon the rods 14 14. Upon the upper opposite ends of the body portion 26 are the rigid guiding-pins 29 29, upon which is mounted the transverse bar 30, having the internally-threaded central hub 31, within which is placed the screw 32, provided at its upper end with the operating-handle 33 and at its lower end held within a central bar 34, integral with the body 26 of the clamping device, the lower end of the said screw 32 having an annular groove, as shown in Figs. 4 and 6, and being engaged at said groove by the screw 35, passing through the said body 26. The purpose of the screw 35 is to engage the annular groove at the lower end of the screw 32 and, while permitting the screw 32 to be rotated, prevent said screw 32 from having any vertical movement. The bar 30 is formed at the opposite sides of its central internally-threaded hub 31 with openings 35' 35', within which are pivotally secured upon the removable pins 36 36 the jaws 37 37, which correspond with one another and extend downward through the slot 27 in the body 26 and at their lower ends are bent toward one another to pass below the lower surfaces of the interior band 13, as shown in Fig. 6. The operation of the screw 32 by means of the handle 33 effects the vertical movement of the bar 30 and clamping-jaws 37, and hence it will be obvious that upon moving the bar 30 the jaws 37 will pass downward or be moved upward in accordance with the direction of motion imparted to the said screw 32. Above the lower ends of the jaws 37 37 and below the bar 34 of the body 26 is secured the rigid bar 38, against which in the employment of the apparatus the jaws 37 press the band 13, the bar 38 operating as a fixed jaw carried by the body 26. The bar or jaw 38 is dovetailed at its upper edges and pressed into the dovetailed groove formed in the body 26 to receive it, and said bar or jaw 38 is thereupon keyed or locked in position by means of a small screw 39, which engages both the body 26 and the bar 38, as shown in Fig. 4. The lower surface of the bar or jaw 38 and the upper surface of the inwardly-bent ends of the jaws 37 37 may be rough, so as the more effectually to grip the interior band 13. The body 26 of the clamping device 25 is provided with the transverse screws 40 40, as shown in Fig. 6, which are adjustable and coöperate with the clamping-jaws 37 37. The screws 40 40 by their position regulate the extent of movement the clamping-jaws 37 37 shall have upon their pivot-pins 36 36, and this provision of the adjusting-screws 40 40 is to adapt the clamping devices for interior bands 13 varying in width. When the screws 40 40 are screwed or moved outward, they will permit a more extended outward swinging motion of the jaws 37 37 in a direction from one another, and hence at such time a wider interior band 13 can be engaged by the said jaws 37 37.

When the bar 30 is, by the operation of the screw 32, caused to move upward, it will draw the clamping-jaws 37 37 upward toward the rigid bar or jaw 38, and if at such time the interior band 13 shall be between the lower inwardly-extending ends of the jaws 37 and the lower surface of the rigid jaw or bar 38 the said band would be firmly clamped between the said parts, and to effect this result is the purpose of the said jaws 37 37 and 38, it being intended that the said jaws shall firmly grip the said band 13 and maintain their hold upon said band until after the overlapping ends of the band have been properly secured together.

The clamping devices 25 25 are, when wholly disconnected from the rods 14 14, applied upon the ends of the band 13 in the manner shown in Fig. 4, the rubber of the tire 12 being pressed backward from the end portions of the band 13, so as to accommodate the clamping devices 25 upon said band and permit a suitable extent of the end portions of the band 13 to project beyond the clamping devices 25 25. After the clamping devices 25 25 have been applied to the end portions of the interior band 13 in the manner shown in Fig. 4, the said band, with the rubber tire and said clamping devices, is applied upon the rim 11 of the wheel 10, and thereupon the rods 14 14 are passed through the sleeves 28 28 of the said clamping devices, after which the key 23 is applied to the said rods 14 14 for the purpose of preventing the said rods 14 14 from slipping from said sleeves 28. The clamping devices 25 25 are then, by means of the screw 17, caused to approach one another, and thereby compelled to draw the adjacent ends of the interior band 13 toward one another from the position in which they are shown in Fig. 4 to that in which they are illustrated in Fig. 5, the ends of the said band 13 being thus caused to overlap one another preparatory to said ends being brazed or riveted together or otherwise secured, so as to unite them. When the tire 12 and clamping devices 25 are applied upon the rim of the wheel, the sleeves 28 28 of said devices will be at the opposite sides of the said rim, as shown in Fig. 6, and the clamping-jaws 37 37 will set downward between the sides of the said rim. When the clamping devices 25 and tire 12 are upon the rim of the wheel, said devices will by the operation of the screw 17 be caused to approach one another, as hereinbefore described, and this has the important effect not only of causing the ends of the interior band 13 to overlap, but to draw the said band 13 tightly around the rim of the wheel, so that the tire 12 may be very effectually secured in place. It will be observed that no difficulty will be experienced in applying the key 23 to the rods 14 after the latter have been inserted through the sleeves 28 of the clamping devices 25, since the rods 14 are exterior to the rubber tire 12 and the key 23 is adapted to straddle the said tire and engage the recesses 22 in the rods 14. I provide several pairs of the recesses 22 in the rods 14 for convenience in applying the tire to the wheel, and upon the application of the rods 14 to the clamping devices 25, if the conditions should be such that the rods 14 cannot be pushed by hand through the sleeves of the clamping devices 25 until they attain the position with respect to said devices shown in Fig. 2, the key 23 will then be placed into engagement with any other pair of the said recesses 22 which may be in position to the left of the left-hand clamping device 25 to receive the same. After the ends of the interior band 13 have been brazed or riveted or otherwise secured together the clamping devices 25 must be removed from said band, and in order to accomplish this result I first detach the key 23 from the rods 14 14 and withdraw said rods from the sleeves 28 of the clamping devices 25, thus leaving the clamping devices 25 detached from one another and upon the band 13, and thereupon remove the pins 36 36 from the cross-bar 30 of the clamping devices, thus leaving the clamping-jaws 37 37 entirely disconnected from the other parts of the clamping devices. This having been accomplished, the clamping devices 25 25 less the jaws 37 37 may be lifted directly from the band 13 and removed from the wheel, leaving the clamping-jaws 37 37 still in position between the sides of the rim 11, where they will be held by the tension of the interior band 13. The jaws 37 37 being then free from the other clamping devices and being simply pinched at their lower ends by the band 13 against the rim 11 may be readily removed by hand, leaving the wheel entirely free from all parts of the apparatus constituting the present invention. The wheel will thereupon be treated in a well-known manner to cause the two ends of the rubber tire to approach one another and cover over the joint formed by the brazing or riveting together of the ends of the band 13. The detached parts of the clamping devices will after their removal from the wheel be restored to their normal relation to one another and be reëmployed as often as may be desired.

In the specification and claims of this application I employ the word "band" in a generic sense, meaning to include within such term a flat band or a single-wire band or a double-wire band or any other kind of an inner metallic band placed within the rubber tire, there being a variety of known bands in use for rubber tires.

What I claim as my invention, and desire to secure by Letters Patent, is—

1. An apparatus for securing rubber tires having an inner band to wheels, comprising clamps adapted to be gripped upon the two ends of said inner band, combined with a frame adapted to engage the outer sides of said clamps for drawing them and the ends of said band toward each other and comprising the longitudinal rods 14 having the cross-bar 15, the sleeves 21 on said rods and having the cross-bar 20, the operating-screw 17 engaging a threaded aperture in one of said cross-bars and connected with the other cross-bar, and means engaging the outer side of one of said clamps, while the said sleeves afford the resistance at the outer side of the other clamp; substantially as set forth.

2. An apparatus for securing rubber tires having an inner band to wheels, comprising clamps adapted to be gripped upon the two ends of said inner band and having the longitudinal sleeves 28 at opposite sides of the wheel, combined with the frame adapted to engage said clamps for drawing them and the ends of said band toward each other and comprising the longitudinal rods 14 passing through said sleeves and connected at one end by a cross-bar, the sleeves 21 on said rods and connected by a cross-bar, the operating-screw 17 engaging a threaded aperture in one of said cross-bars and connected with the other cross-bar, and the removable key engaging said rods 14 at the outer side of one of said clamps, while the said sleeves are at the outer side of the other of said clamps; substantially as set forth.

3. An apparatus for securing rubber tires having an inner band to wheels, consisting of clamps adapted to be gripped upon the two ends of said inner band and composed of the body portion having a jaw 38 to engage one surface of the said band, a movable portion 30, the jaws 37 secured at the opposite sides of the center of said movable portion and adapted at their lower end to engage the other surface of said band, means for moving said movable portion to bind the said jaws against said band, and removable means securing said jaws 37 to said movable portion, combined with means for engaging said clamps and drawing them and the ends of the said inner band toward one another; substantially as set forth.

4. An apparatus for securing rubber tires having an inner band to wheels, consisting of clamps adapted to be gripped upon the two ends of said inner band and composed of the body portion having a jaw 38 to engage one surface of the said band, the jaws 37, 37, having inwardly-turned lower ends to engage the other surface of said band, means for drawing the jaws 37 toward said jaw 38 to grip said band, and removable means securing said jaws 37 so that the parts of the clamp less said jaws may be detached from said band, combined with means for engaging said clamps and drawing them and the ends of said inner band toward one another; substantially as set forth.

5. An apparatus for securing rubber tires having an inner band to wheels, consisting of clamps adapted to be gripped upon the two ends of said inner band and composed of the body portion having a jaw 38 to engage one surface of the said band, the jaws 37, 37, having inwardly-turned lower ends to engage the other surface of said band, the set-screws 40 for limiting the outward movement of said jaws 37 and setting them inward against the band, means for drawing the jaws 37 toward said jaw 38 to grip said band, and removable means securing said jaws 37 so that the parts of the clamp less said jaws may be detached from said band, combined with means for engaging said clamps and drawing them and the ends of said inner band toward one another; substantially as set forth.

6. An apparatus for securing rubber tires having an inner band to wheels, consisting of clamps adapted to be gripped upon the two ends of said inner band and composed of the body portion having a jaw 38 to engage one surface of the said band, the movable portion 30 guided on said body portion, the screw 32 engaging a threaded aperture in said portion 30 and engaging said body portion, the jaws 37, 37, having inwardly-turned lower ends to engage the other surface of said band, and removable pins 36 securing said jaws 37 to said movable portion 30, combined with means for engaging said clamps and drawing them and the ends of said inner band toward one another; substantially as set forth.

7. An apparatus for securing rubber tires having an inner band to wheels, consisting of clamps adapted to be gripped upon the two ends of said inner band and composed of the body portion having a jaw 38 to engage one surface of the said band, the jaws 37, 37, extending through the openings 27 in said body portion and having their lower ends turned inwardly to pass below said jaw 38 and engage the other surface of said band, the bar 30 guided on said body portion and having the openings 35' within which the upper ends of said jaws 37 are pivotally secured, and the operating-screw 32 engaging a threaded aperture in the bar 30 and connected with the said body portion, combined with means for engaging said clamps and drawing them and the ends of said inner band toward one another; substantially as set forth.

8. An apparatus for securing rubber tires having an inner band to wheels, consisting of clamps adapted to be gripped upon the two ends of said inner band and composed of a body portion having a fixed jaw for engaging the upper surface of said band, a pair of movable jaws for engaging the lower surface of said band, means for operating said jaws to grip the said band, and removable means securing said movable jaws so that when desired all parts of said clamp less said movable jaws may be removed from the said band, combined with means for engaging said clamps and drawing them and the ends of said inner band toward one another; substantially as set forth.

Signed at New York, in the county of New York and State of New York, this 12th day of October, A. D. 1900.

GEORGE MEYER.

Witnesses:
CHAS. C. GILL,
GUNDER GUNDERSON.